3,219,541
METHOD OF PREVENTING CARBURIZATION OF FUEL ELEMENT CLADDING METALS BY URANIUM CARBIDE FUELS
Bradley A. Webb, Granada Hills, Calif., assignor, by mesne assignments, to the United States of America as represented by the United States Atomic Energy Commission
No Drawing. Filed Aug. 10, 1962, Ser. No. 216,077
5 Claims. (Cl. 176—67)

My invention relates to a method of preventing carburization of nuclear reactor fuel element cladding metals by uranium carbide fuels, and more particularly to a method of preventing carbon transfer from hyperstoichiometric uranium carbide fuel to stainless steel cladding.

Uranium monocarbide (hereinafter referred to as UC or uranium carbide) shows considerable promise as a fuel material for high temperature nuclear reactors, such as liquid sodium-cooled reactors. Uranium carbide possesses the high burn-up characteristics and radiation stability of ceramic fuels such as $UO_2$, and also has heat transfer characteristics considerably superior to the ceramic fuels, approaching those of uranium metal. Irradiation data for uranium carbide indicate that a maximum burn-up level has not been reached at 20,000 mwd./m.t. U and at a peak temperature of 1950° F. Fission gas release is small and dimensional changes are well within acceptable limits. However, materials compatibility, as influenced by temperature and fuel composition, presents definite limitations on UC fuels. A severe problem in this area is the carburization of ferrous metal claddings by hyperstoichiometric UC in a sodium environment at temperatures above 1000° F. (Sodium or NaK is used as a bonding agent between UC and metal claddings in fuel elements.) The stoichiometric concentration of carbon in uranium monocarbide is 4.80 weight percent; however, the control of carbon content in UC to close tolerances in the current arc melting and casting methods is extremely difficult and may not be a satisfactory solution to the carburization problem. The use of hypostoichiometric UC has been suggested, but other problems may be created by its use, such as poor radiation stability of included uranium, phase inversions, and low uranium melting point.

The $UC_2$ phase in hyperstoichiometric UC is a carbon source for carburization of the cladding, and the degree of carburization of the cladding is directly related to the carbon content of the UC for a given time and temperature. At 1200° F. operation, the carbon level in type 304 stainless steel cladding reaches about 0.5% at a UC composition of 4.84 weight percent carbon, and about 1.0% at a UC composition of about 4.88 weight percent carbon. This carburization rate is of such a magnitude that a UC fuel element bonded to a stainless steel cladding with a sodium bond has a considerable risk of failure during its operating lifetime from cladding cracks caused by embrittlement of the steel. Therefore, uranium carbide fuel elements cannot be safely used as a fuel in high temperature reactors unless carbon diffusion to the cladding is prevented.

The principal object of my invention is to provide a method of preventing carburization of cladding metals for uranium carbide fuel elements.

Another object is to provide a method of preventing carburization of ferrous metal claddings by uranium carbide fuel material.

Another object is to provide a method of preventing carbon transfer from hyperstoichiometric UC fuel to stainless steel cladding.

Another object is to provide a method of controlling the composition of hyperstoichiometric uranium carbide.

Still another object is to provide a method of removing $UC_2$ in a hyperstoichiometric UC fuel composition.

A further object is to provide a relatively simple and effective means of accomplishing such $UC_2$ removal.

Other objects and advantages of my invention will become apparent from the following detailed description and the appended claims.

In accordance with my present invention, I have provided a method of preventing carbon transfer from hyperstoichiometric UC to a metal cladding by a method which comprises, prior to inserting a UC fuel slug into its metal cladding, heating the UC slug at a temperature above about 1000° C. for a sufficient time to completely transform the $UC_2$ to $U_2C_3$. I have found that the rate of carbon transfer from $U_2C_3$ is strikingly lower than from $UC_2$, at least of an order of magnitude, and that significant carburization of metal cladding does not occur. The use of my invention thus not only permits the utilization of UC fuels in high temperature nuclear reactors, but also has a number of manufacturing (and hence economic) advantages in the fabrication of the fuel elements. The use of my invention permits wide variation of carbon limits in UC production since minimizing the amount of the $UC_2$ phase is no longer necessary from a carbon transfer standpoint. The present severe process control requirements which are imposed to maintain stoichiometry are relieved.

While I do not wish to be bound to any particular mechanism for explaining why carburization of stainless steel is much slower from the $UC+U_2C_3$ structure than from the as-cast $UC+UC_2$ structure, since such is not necessary for the practical utilization of my invention, the effects may be due to any one or a combination of the following factors. First, the carbon activity in $U_2C_3$ is probably intermediate to the carbon activities in UC and $UC_2$. This results in a lower activity gradient between $U_2C_3$ and the stainless steel cladding than between $UC_2$ and the cladding. Therefore, less carbon is required in the stainless steel to reach equilibrium with the carbon in the transformed fuel and less transfer will take place. Secondly, the rate of solution of carbon diffusion through the $UC+U_2C_3$ structure is apparently slow, since the $U_2C_3$ phase is not interconnected at low carbon concentrations (4.8 to 5.2 weight percent C) and, therefore, carbon must diffuse through the UC matrix to reach the sodium interface. With the $UC+UC_2$ structure, the sodium selectively attacks the interconnected $UC_2$ phase and continually maintains the reaction interface at the carbon source. For all these reasons the overall carburization of stainless steel cladding from UC fuel, treated in accordance with my invention, can be expected to be extremely small at the end of the projected fuel element life in comparison to carburization from as-cast UC fuel.

In the practice of my invention, hyperstoichiometric UC is heated in an inert environment to convert the $UC_2$ present into $U_2C_3$. By an inert environment is meant either a vacuum or an inert gas atmosphere such as provided by argon or helium. The heating is conducted at a temperature of at least about 1000° C. for sufficient time to completely transform the $UC_2$ into $U_2C_3$. The time will vary with the temperature. Complete transformation has been accomplished, for example, in about 2 hours at 1600° C., and in about 7 hours at 1300° C.

The following example is offered to illustrate my invention in greater detail.

*Example*

Uranium carbide specimens containing 6.5 weight percent carbon were heat treated in vacuum for 2 hours at 2900° F. to transform the $UC+UC_2$ into $UC+U_2C_3$. Metallographic examination and X-ray diffraction verified that complete transformation had occurred.

Transformed specimens and as-cast specimens of the same composition were placed in 0.010-inch wall type 304 stainless steel capsules having a 0.010-inch annular clearance between the specimen and wall, bonded with sodium, and welded under a helium atmosphere. Capsules containing 4.8, 5.1, 5.4, 5.8, and 9.7 weight percent carbon UC specimens were prepared for comparison. Capsules containing only helium and sodium were also included as controls. The capsules were placed in a large stainless steel container and welded under a helium atmosphere to protect against capsule failure by oxidation.

The containers were placed in a soaking furnace and heated for 300 hours at $1600 \pm 7°$ F. The test specimens were discharged from the furnace and the top and bottom end caps removed. The capsules and contents were placed in individual glass beakers and the sodium was digested in butyl alcohol. The capsules and carbide specimens were sectioned longitudinally and mounted in cold-setting plastic for metallographic examination. Samples of the cladding were analyzed for carbon content.

Visual examination of the specimens disclosed no erosion or macroscopic porosity. However, a uniformly decarburized zone was evident on the surface of the as-cast hyperstoichiometric specimen after cutting. The inner walls of capsules containing these specimens were discolored.

Metallographic examination of the carbide disclosed complete decarburization on all specimens containing $UC_2$ to a depth of approximately 0.015–0.020 inch, and no apparent decarburization of the $UC+U_2C_3$ or the stoichiometric UC specimens. Metallographic examination of the stainless steel cladding disclosed increasing carburization with increasing carbon content of the UC above 4.8 weight percent carbon, with the exception of the transformed $UC+U_2C_3$ specimens. Chemical analysis of the cladding from these tests substantiated the metallographic analysis. There was virtually no increase in the carbon analysis of the stainless steel jacket which contained the $UC+U_2C_3$ phase, while there was a sharp increase in carbon content of the cladding which contained the as-cast UC. The carbon concentration of 0.035-inch-thick type 304 stainless steel cladding changed from an original 0.08% to about 0.085% for the transformed UC and to about 1.0% for the as-cast UC. This further illustrates the effect of the $U_2C_3$ phase in reducing carburization of stainless steel.

The above example is illustrative rather than restrictive of my invention. Various manipulative steps and techniques may be employed which are within the scope of my invention, and therefore my invention should be understood to be limited only as indicated in the appended claims.

I claim:

1. A uranium carbide nuclear reactor fuel element having a carburizable metal cladding stabilized against carburization by carbon transfer from the fuel material present, which comprises, in combination, a carbon-stable reactor fuel material consisting essentially of UC plus $U_2C_3$ and a carburizable metal cladding for said material.

2. A fuel element according to claim 1 wherein said metal cladding is a ferrous metal cladding.

3. A fuel element according to claim 1 wherein said metal cladding is of stainless steel and sodium is disposed between said fuel material and said cladding to bond said fuel material to said cladding.

4. The method of preparing a uranium carbide nuclear reactor fuel element having a carburizable metal cladding stabilized against carburization by carbon transfer from the fuel material present which comprises heating in an inert environment at a temperature of at least 1000° C. hyperstoichiometric uranium carbide containing a $UC_2$ phase to transform said $UC_2$ to $U_2C_3$ and assembling the heat-treated uranium carbide in a metal cladding to form said fuel element.

5. The method of claim 4 wherein the uranium carbide is heated in a vacuum at a temperature of approximately 1600° C. for approximately 2 hours to effect the $UC_2$ to $U_2C_3$ transformation.

References Cited by the Examiner
UNITED STATES PATENTS

| | | | |
|---|---|---|---|
| 2,580,349 | 12/1951 | Fisher | 23—14.5 |
| 2,967,812 | 1/1961 | Thurber | 176—70 |
| 3,044,946 | 7/1962 | Litton | 252—301.1 |
| 3,046,090 | 7/1962 | Powers | 23—14.5 |

OTHER REFERENCES

Chubb et al.: Transaction of American Society for Metals, vol. 53 (1961), pp. 465–477. (Copy is available in Group 110.)

Webb: Transaction of American Nuclear Society, vol. 4 (1961), p. 349. (Copy available in POSL.)

REUBEN EPSTEIN, *Primary Examiner.*

CARL D. QUARFORTH, *Examiner.*